United States Patent [19]

Chou

[11] 4,373,548
[45] Feb. 15, 1983

[54] GAS FLOW SAFETY CONTROL DEVICE

[76] Inventor: Martin S. Chou, No. 13, Section 2, Kuang Fu Rd., San Chung City, Taipei Hsien, Taiwan

[21] Appl. No.: 281,342

[22] Filed: Jul. 8, 1981

[51] Int. Cl.³ ............................................. F16K 17/00
[52] U.S. Cl. .................................. 137/460; 137/498; 137/519.5; 251/207
[58] Field of Search ................... 137/460, 498, 519.5; 251/207

[56] References Cited

U.S. PATENT DOCUMENTS

| | | | |
|---|---|---|---|
| 1,088,103 | 2/1914 | Schreidt | 251/207 X |
| 3,830,252 | 8/1974 | Follett | 137/519.5 |
| 3,850,189 | 11/1974 | Follett | 137/460 X |
| 4,257,448 | 3/1981 | Shiv | 137/460 |

FOREIGN PATENT DOCUMENTS 2249598 5/1973 Fed. Rep. of Germany ...... 137/460

*Primary Examiner*—Harold W. Weakley
*Attorney, Agent, or Firm*—Shoemaker and Mattare, Ltd.

[57] ABSTRACT

A safety device for controlling the excess flow of gas adapted to shut off the flow of gas when the flow of gas exceeds a predetermined level. The device comprises a cylinder having in one end a throat member through which the gas flows, and a plurality of orifices formed around the cylinder through which orifices the gas is delivered to the throat member and then to a burner; a ball disposed at the other end of the cylinder, the ball having one side subject to the supply pressure of the gas and the opposite side subject to the delivery pressure of the gas. When the flow or delivery rate of the gas exceeds the predetermined level that is determined by the flow capacity of the orifices, the delivery pressure of the gas decreases to allow the ball to be pushed by the supply pressure of the gas so as to close the throat member, thus shutting off the flow of the gas.

2 Claims, 3 Drawing Figures

GAS FLOW SAFETY CONTROL DEVICE

BACKGROUND OF THE INVENTION

This invention relates to a safety device for controlling the excess flow of gas, particularly a safety device which will automatically shut off the flow of gas when the flow exceeds a predetermined level.

Liquid gas for domestic use is conventionally stored in a tank with its flow being controlled at the tank outlet port by a pressure regulator. The gas then flows to the gas burner through a suitable conduit such as a flexible hose. No further safety devices are provided.

The flexible hose, however, is easily damaged and ruptures often develop in the hose which lead to excess flow of the gas, allowing dangerous amounts of gas to leak and perhaps cause explosions.

Therefore it is a main object of this invention to provide a convenient and easily adjustable gas flow safety control device which will automatically shut off the flow of gas from the tank when it exceeds a predetermined level.

Other objects and features of the present invention will be apparent from the following detailed description taken in conjunction with the accompanying drawings.

DETAILED DESCRIPTION OF THE INVENTION

Figure 1:
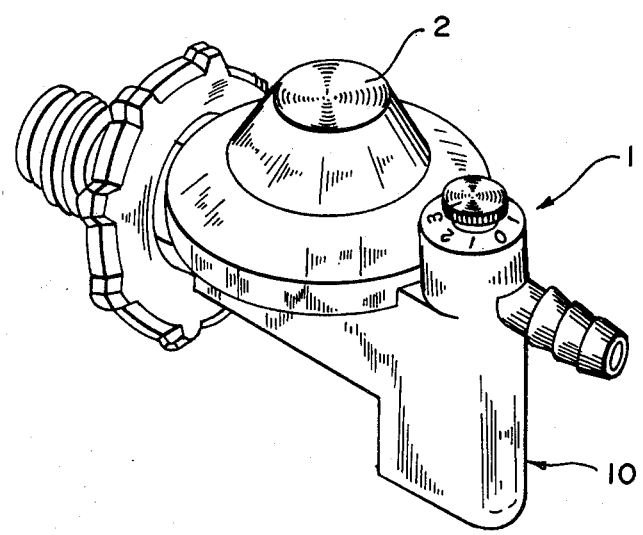
FIG. 1 is a perspective view of an embodiment of the present invention, wherein the casing of the safety control device is integrally formed with the pressure regulator.

Referring to FIG. 1, the gas flow safety control device 1 of this invention is shown having it casing integrally formed with the pressure regulator 2, and is connected to the gas tank (not shown) by means of a threaded connecting fitting and to the gas burner by suitable conduit such as a flexible hose (also not shown). At the top of casing 10 of the device 1 are graduations to indicate both the angular position of the control cylinder to be explained later and the amount of gas flow predetermined by the control cylinder.

Figure 2:
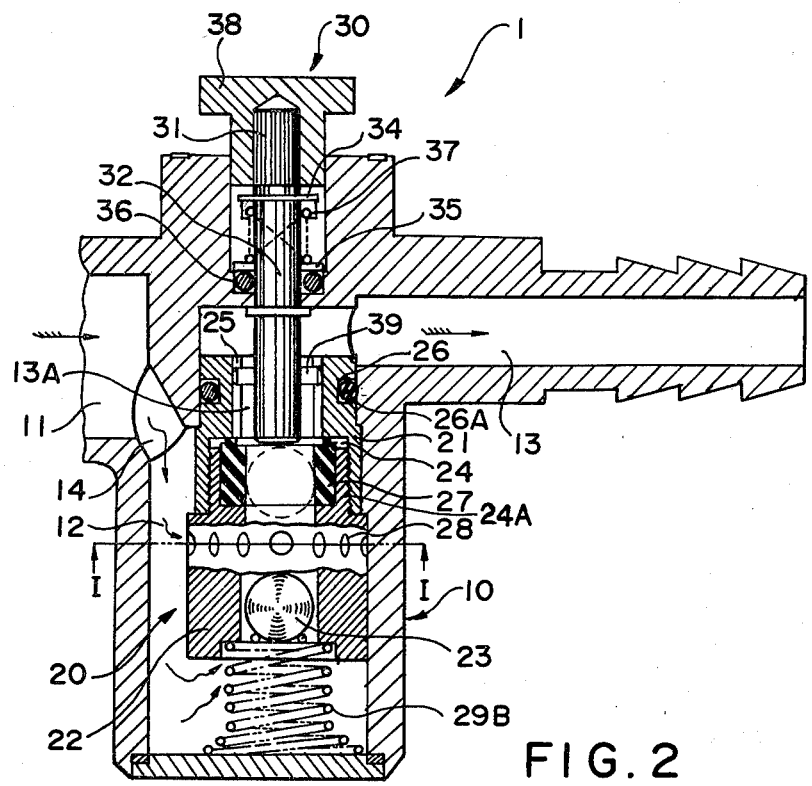
FIG. 2 is a longitudinal, cross-sectional view of an embodiment of the present invention.

As shown in FIG. 2, safety control device 1 comprises a casing 10, a flow control valve 20, and an adjusting handle 30. The casing 10, preferrably integrally formed with the pressure regulator, is provided with an inlet port 11, a gas compartment 12, and an outlet port 13. The inlet port 11 is connected to the pressure regulator 2. The gas is supplied from the inlet port 11 into the gas compartment 12 through a passage 14 formed therebetween. The gas compartment 12 is provided therein with a flow control valve 20 to control the amount of gas flow through safety control device to the gas burner through outlet port 13 and the flexible hose, not shown.

The flow control valve 20 comprises an operating cylinder 21 and a control cylinder 22 having a valve ball 23 provided in the lower part of interior passage thereof. The operating cylinder 21 is formed with keyways 25 opposite each other cut into its upper interior wall, a groove 26 around its outer circumference into which is placed seal 26A, and a lower end having an enlarged interior formed with female screw threads on the inner wall. Control cylinder 22 is provided with an upper portion 24A having male screw threads around its outer surface to engage the female screw threads in the lower end of operating cylinder 21, the upper portion 24A having an annular recess to receive a throat member 27 formed with a slightly tapered interior passage capable of restraining and traping valve ball 23, which is normally displayed in the interior of the lower part of control cylinder 22, but which will be pushed upwards by gas pressure acting from below to engage in the throat member when the flow of gas exceeds a predetermined level to be explained later. Control cylinder 22 is further provided with a plurality of radial holes or orifices 28 formed in a row around approximately one half of the outer circumference generally at the middle part of the control cylinder, and a recess in the lower end thereof into which the upper end of spring 29B is inserted. Valve ball 23 is normally supported by spring 29B.

Figure 3:
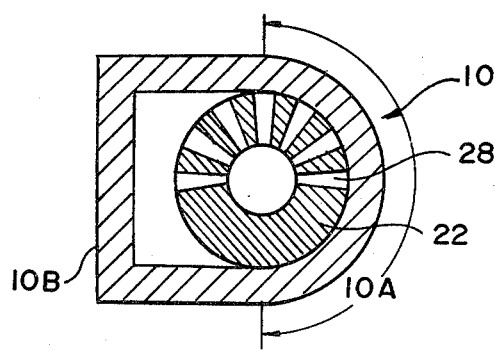
FIG. 3 is a cross-sectional view taken along the line I—I of FIG. 2, showing the control cylinder and the orifices provided therein.

As shown in FIG. 3, the lower part of casing 10 is provided with a semicylindrical portion 10A and a rectangular portion 10B.

The lower portion of control cylinder 22 into which orifices 28 are formed is arranged coaxially with semicylindrical portion 10A and is in close contact with the inner wall of the semicylindrical portion 10A of the casing 10.

The adjusting handle 30 comprises a head 21 extending beyond the top of casing 10 and a stem 32 extending into the interior passage of operating cylinder 21. The head 31 engages adjusting knob 38. Just below head 31 is provided a pressing plate 34 and a washer 35 with spring 37 provided therebetween to urge the adjusting means 30 upwards. At an appropriate position towards the bottom of stem 32 is provided dowel pin 39 which is engaged within operating cylinder keyways 25 mentioned above. The interior of the upper portion of operating cylinder 21 is sufficiently large to provide a passage 13A through which gas flows when the lower part of stem 32 is inserted therein. A seal 36 is provided directly below washer 35. When adjusting knob 38 is turned, stem 32 revolves and turns operating cylinder 21 and control cylinder 22, thereby gradually increasing or decreasing the portion of orifices 28 not closed by their proximity to the inner wall of the semicylindrical portion 10A of the casing 10. Valve ball 23 can be released and returned to its normal position after having been trapped in the tapered interior passage of throat member 27 by the gas supply pressure (when excessive amount of gas is delivered) merely by pressing downwards on adjusting knob 38 which will force the lower end of stem 32 downwards to untrap the valve ball 23 thus forcing valve ball 23 downwards away from the tapered inner passage. When the downward pressure is released, the upward pressure of spring 37 between pressing plate 34 and washer 35 will urge the adjusting handle 30 back to its original position.

The amount of excessive gas flow for which the safety device of this invention is set to operate can be predetermined by turning adjusting knob 38 according to the graduation marked on the top of the casing 10 as shown in FIG. 1. When connected in normal use between the gas tank and the flexible hose of a gas burner, turning adjusting knob 38 towards a higher graduation will cause operating cylinder 21 and control cylinder 22 to rotate and to gradually expose more the orifices 28 which were previously closed by their proximity to the inner wall of the semicylindrical portion of the casing 10, therefore allowing a greater flow of gas through the flow control valve 20. Decreasing the flow of gas through the flow control valve 20 is accomplished by turning the adjusting knob 28 in the opposite direction. When the adjusting knob 38 is set at the "O" gradution, the flow of gas through the flow control valve 20 will be reduced to the minimal amount of gas that can flow around valve ball 23 without forcing it upwards to be restrained and tapped in the interior passage of throat member 27, as all orifices 28 will be closed by the inner wall of the semicylindrical portion of casing 10. When the adjusting knob 38 is set at the highest graduation the excess flow of gas set to operate the device will be at its maximum, as all radial holes 28 will be exposed.

The operation of the gas flow safety control device of this invention will now be described as follows.

In normal operation, the major part of the gas flows through orifices 28 and a small part flows through the clearance between the valve ball 23 and the inner wall of the lower portion of control cylinder 22. The gas pressure in the passages 13A and 13, or the gas delivery pressure, is nearly the same as the gas pressure in compartment 12 or gas supply pressure. If the flow of gas in passage 13 increased excessively as in the case there is a leak or breakage or rupture in the flexible tube, the gas delivery pressure decreases since the gas flow is restricted by the orifices 28. The decrease in gas delivery pressure causes valve ball 23, being pushed by the gas supply pressure which remains unchanged, upwards until it is restrained and trapped in the interior passage of throat member 27, thus completely blocking the interior passage of operating cylinder 21 and control cylinder 22. After the rupture has been repaired the adjusting means 30 can be depressed, thereby forcing the valve ball 23 to disengage from the throat member 27 and allowing valve ball 23 to return to its normal position and the normal flow of gas to be restored.

Although a preferred form of the present invention has been illustrated and described, it is understood that numerous modifications can be made without departing from the principles of the invention. Accordingly, the scope of the invention is to be limited by the claims appended hereto.

I claim:

1. A gas flow safety control device, comprising:
    a casing provided with an inlet port to be connected to a gas supply source, a gas compartment connected to said inlet port, an outlet port through which the gas is delivered to a gas burner, said gas compartment provided with a semicylindrical wall having a longitudinal axis;
    a cylinder member rotatably coaxially inserted in said gas compartment in said casing, having an inner passage, an upper open end connecting said inner passage to said outlet port, a lower open end connecting said inner passage to said gas compartment, an outer cylindrical surface in contact with said semicylindrical wall of said gas compartment, a plurality of orifices formed in a row around approximately one half of the outer circumference so that when said cylinder member is rotated to dispose said orifices against said semicylindrical wall the orifices are closed, and when said cylinder member is rotated to dispose said orifices opposite to said semicylindrical wall the orifices are exposed to said gas compartment thus connecting said gas compartment with said inner passage;
    a ball member capable of freely passing through the lower part of said inner passage of said cylinder member, said ball member being supported by a coil spring so as to be disposed in the lower part of said inner passage of said cylinder member blow said row of orifices;
    a throat member fixedly disposed between said upper open end of said inner passage of said cylinder member and said row of orifices in said inner passage, having slightly tapered interior passage which may be closed by traping said ball member when said ball member is pushed upwards from below; and
    an operating handle operatively connected to said cylinder member from above.

2. A gas flow safety control device as recited in claim 1, wherein said operating handle is provided with a lower stem having a key member longitudinally slidably engaged in longitudinal keyways formed in the upper part of said cylinder member, a spring urging said operating handle upwards, said operating handle being longitudinally slidably supported by said casing so as to allow said lower stem to extend into the slightly tapered interior passage of said throat member when pushed down from above, and said key member capable of rotating said cylinder member when said operating handle is rotated.

* * * * *